United States Patent [19]

Corrales

[11] Patent Number: 5,021,813
[45] Date of Patent: Jun. 4, 1991

[54] MANUALLY OPERATED HANDLE FOR PANORAMIC CAMERA

[76] Inventor: Richard C. Corrales, 7355 College Ave., Whittier, Calif. 90602

[21] Appl. No.: 575,397

[22] Filed: Aug. 29, 1990

[51] Int. Cl.⁵ .............................................. G03B 29/00
[52] U.S. Cl. ........................................ 354/82; 354/94; 354/293
[58] Field of Search ...................... 354/81, 82, 94, 95, 354/96, 97, 98, 293, 295, 99; 352/69, 243

[56] References Cited

U.S. PATENT DOCUMENTS 4,864,335  9/1989  Corrales .................................. 354/99
4,905,030  2/1990  Corrales .................................. 354/82

Primary Examiner—Brian W. Brown
Assistant Examiner—Howard B. Blankenship
Attorney, Agent, or Firm—Edgar W. Averill, Jr.

[57] ABSTRACT

A manually operated handle for a panoramic camera. The handle has a handle body which contains a rotatable central shaft to which a reel is connected by a one-way clutch. A second one-way clutch is connected between the shaft and the handle body. A spring is connected between the reel and the handle body, and the clutches are arranged so that when the reel is turned in a first direction by pulling a draw string, the central shaft is stationary, but when the reel is released, the central shaft turns thereby turning the panoramic camera and retracting the draw string.

6 Claims, 1 Drawing Sheet

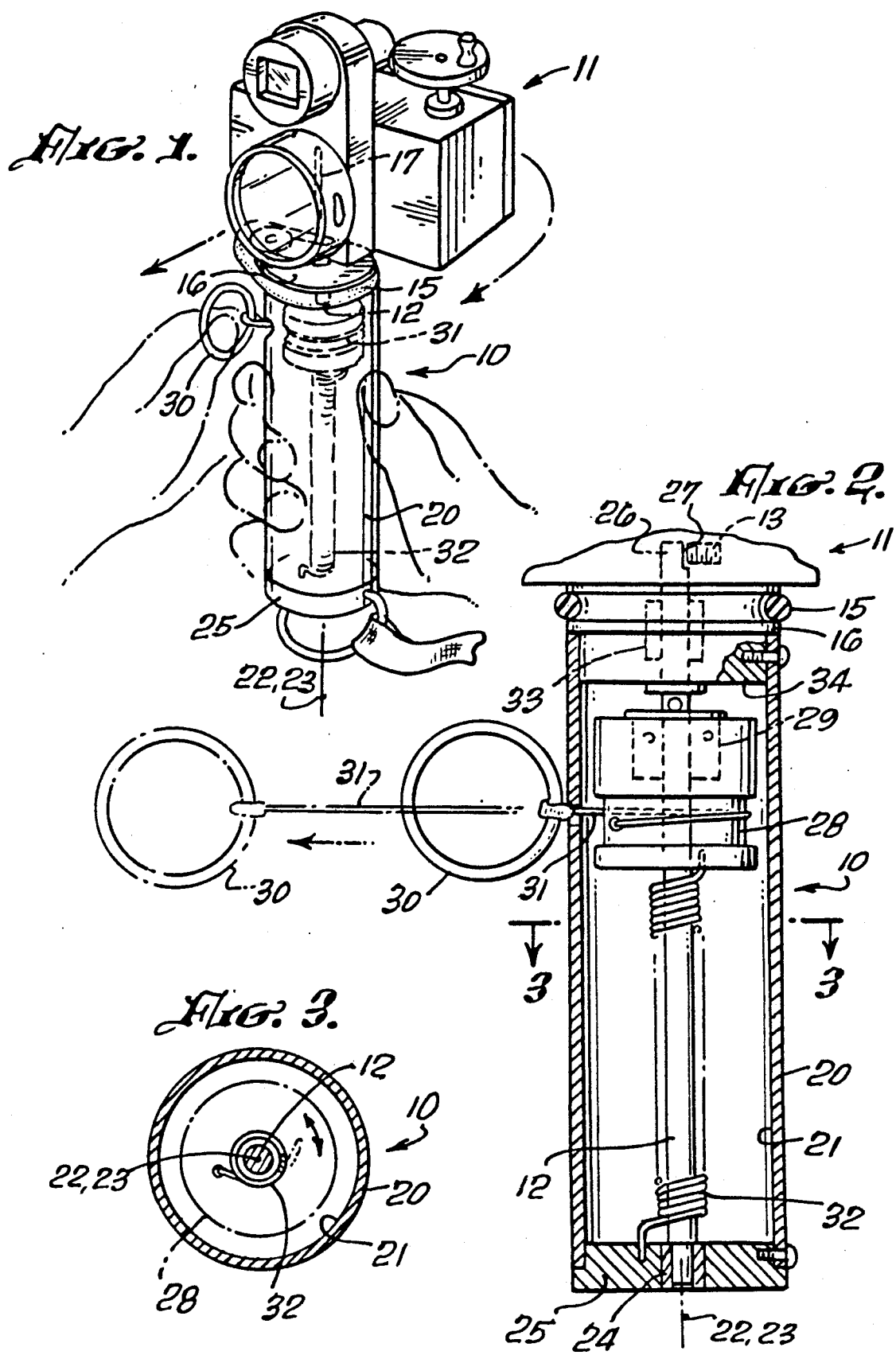

MANUALLY OPERATED HANDLE FOR PANORAMIC CAMERA

CROSS-REFERENCES TO RELATED APPLICATIONS

The handle of the present invention is used with the panoramic camera shown in applicant's U.S. Pat. No. 4,864,335. A different handle construction is shown in applicant's U.S. Pat. No. 4,905,030.

BACKGROUND OF THE INVENTION

The field of the invention is photography, and the invention relates more particularly to panoramic cameras of the type useful for taking a picture while being rotated. One such camera is shown in applicant's U.S. Pat. No. 4,864,335. Such patent discloses a handle which has a shaft connectable to the camera, which shaft is operated by a battery driven motor. This patent is incorporated by reference herein for further description of the camera operation. Such handle is useful for many applications, but has the inherent shortcomings of any battery operated device, namely, the imperfect movement of the device when the battery is about dissipated plus the weight and expense of the needed apparatus and batteries.

SUMMARY OF THE INVENTION

It is an object of the present invention to provide a manually operated handle for panoramic cameras.

The present invention is for a manually operated handle for panoramic cameras comprising a handle body having a central opening, said handle body having a vertical axis. A rotatable central shaft is held by the handle body, and the central shaft has a central axis which is parallel to the vertical axis of the handle body. The central shaft has an upper portion affixable to a panoramic camera, and the lower portion is held within the handle body. Reel means is positioned within the handle body and affixed to the lower portion of the central shaft, said reel means having an axis of rotation at said central axis of said central shaft. A first one-way clutch is affixed between the lower portion of the central shaft and the reel means. This one-way clutch permits the reel means to turn freely in a first direction with respect to the central shaft but when the reel is turned in a direction opposite to the first direction, it causes the central shaft to turn with the reel means. Line means is wrapped around the reel means and has its inner end affixed to the reel means and extends outwardly from the handle body. Spring means is affixed between the handle body and the reel means so that when the reel means is turned in a first direction by the pulling of the line means, the spring means will cause the reel means to turn in the opposite direction when the line means is released. A second one-way clutch is held by the handle body and contacts the central shaft permitting it to turn only in a second direction. Thus, in use, the line is pulled thereby turning the reel and tightening the spring. When the line is released, the reel returns to its original position turning the central shaft and the panoramic camera with it, and the line is retracted. Preferably, the spring is affixed about the central shaft, and the central shaft extends the full length of the central opening of the handle. Preferably, the line extends just once around the reel so that the pulling of the line turns the camera about 360°.

BRIEF DESCRIPTION OF THE DRAWINGS

FIG. 1 is a perspective view of a panoramic camera affixed to the manually operated handle of the present invention.

FIG. 2 is an enlarged cross-sectional view of the manually operated handle of FIG. 1.

FIG. 3 is a cross-sectional view taken along line 3—3 of FIG. 2.

DESCRIPTION OF THE PREFERRED EMBODIMENTS

The handle of the present invention is indicated by reference character 10 in FIG. 1 and is affixed to a panoramic camera 11 of the type described in U.S. Pat. No. 4,864,335. Briefly, the camera operates by being affixed to the central shaft 12 by a set screw 13, or other means, shown in FIG. 2. As the shaft turns, an 0-ring 15 is held in a large pulley 14 affixed to handle 10 and a small pulley 16 on the bottom of panoramic camera 11. Reel 16 is connected to the take-up reel of a spool of film and, thus, as the shaft 12 is turned, the pulley 16 draws the film along the back of camera 11 at the same rate the image passing through slit 17 is moved. The result is a clear 360° (more or less) negative which may be printed by a special enlarger or by contact printing means.

A particularly easy-to-use and low cost handle is shown in cross-sectional view in FIG. 2. The handle has a handle body 20 with a central opening 21. The rotatable central shaft 12 has a central axis 22 which is coincident with the vertical axis 23 of handle body 20. The shaft 12 is held in a bushing 24 held by the bottom plate 25 of handle body 20. Shaft 12 extends outwardly past pulley 24, and the upper portion of central shaft 12 is indicated by reference character 26. A flat 27 assists in securing the panoramic camera 11 to the rotatable central shaft 12.

A reel 28 is held around central shaft 12 by a first one-way clutch 29. This one-way clutch permits the reel to be turned in the direction caused by the pulling of pull ring 30 which unwinds the line 31 and turns the reel in a first direction. As pull ring 30 is slowly released, a helical spring 32 causes the reel 28 to rewind, and the first one-way clutch causes the rewinding of the reel to turn rotatable central shaft 12. A second one-way clutch 33 is held by the top plate 34 of handle body 20 and permits the movement of the rotatable central shaft only in the second direction and prohibits its movement in the first direction. Thus, when the pull ring 30 is pulled away from handle body 20, the rotatable central shaft is prevented from turning by second one-way clutch 33.

While it is, of course, possible to reverse the direction of both one-way clutches and to cause the camera to turn as pull ring 30 is withdrawn, it has been found far more preferable to cause the camera to turn on the release of the ring since the spring applies a constant force during line retraction which translates to a smooth and even movement of the camera body.

Ideally, the line 31 contacts slightly more than 360° around reel 28. It is shown in the drawings as slightly less so that it is evident that the line is affixed to the reel. However, preferably, the point of connect would be slightly further around the reel as viewed in FIG. 2 of the drawings to result in a full 360° turn so that all portions of a panorama may be photographed. While a helical spring is shown in the drawings, of course a coil spring, or other biasing means, could be used. The resulting handle is both light in weight, low in manufacturing costs and reliable in operation.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A manually operated handle for panoramic cameras comprising:
    a handle body having a central opening, said handle body having a vertical axis;
    a rotatable central shaft held by said handle body, said central shaft having a central axis parallel with the vertical axis of said handle body, said central shaft having an upper portion affixable to a panoramic camera and said central shaft having a lower portion within the handle body;
    reel means within said handle body affixed to the lower portion of said central shaft, said reel means having an axis of rotation at said central axis of said central shaft;
    a first one-way clutch means between the lower portion of said central shaft and said reel means, said first one-way clutch means causing the reel means to turn freely in a first direction with respect to the central shaft but when said reel is turned in a direction opposite to said first direction, it causes the central shaft to turn with the reel means resulting in the turning of the reel in said direction opposite the first direction and turning the central shaft and the panoramic camera with respect to the handle body;
    line means wrapped about said reel means and having its inner end affixed to said reel means and extending outwardly from the handle body;
    spring means affixed between the handle body and said reel means so that when the reel means is turned in a first direction by the pulling of the line means, the spring means will cause the reel means to turn in the opposite direction when the line means is released;
    a second one-way clutch held by said handle body, said second one-way clutch contacting said central shaft and permitting it to turn only in a second direction, whereby when said reel means is moved in a first direction by the pulling of said line means, said reel means turns freely with respect to said central shaft but when said line means is released, the spring means turns the reel means in a direction opposite to said first direction, and said second one-way clutch transmits the rotary motion of said reel means to said central shaft thereby turning said panoramic camera and retracting the line means.

2. The manually operated handle of claim 1 wherein said line means has an enlarged ring at the outer end thereof to facilitate the pulling and releasing of the line means.

3. The manually operated handle of claim 1 wherein said spring means is a helical spring positioned about the central shaft.

4. The manually operated handle of claim 3 wherein said reel means is positioned near the top of the central opening of said handle body, and the spring means is affixed between the bottom of said reel means and the bottom of said handle body.

5. The manually operated handle of claim 1 wherein the line means is wrapped once about said reel means.

6. A manually operated handle for panoramic cameras comprising:
    a handle body having a central opening, said handle body having a vertical axis, a top and a bottom;
    a rotatable central shaft held by the top and bottom of said handle body, said central shaft having a central axis parallel with the vertical axis of said handle body, said central shaft having an upper portion extending above said handle top which is affixable to a panoramic camera and said central shaft having a lower portion within the handle body extending to the bottom thereof;
    reel means within said handle body affixed to the lower portion of said central shaft near the top of said handle body, said reel means having an axis of rotation at said central axis of said central shaft;
    a first one-way clutch means between the lower portion of said central shaft and said reel means, said first one-way clutch means causing the reel means to turn freely in a first direction with respect to the central shaft but when said reel is turned in a direction opposite to said first direction, it causes the central shaft to turn with the reel means resulting in the turning of the reel in said direction opposite the first direction and turning the central shaft and the panoramic camera with respect to the handle body;
    line means wrapped about said reel means and having its inner end affixed to said reel means and extending outwardly from the handle body and having a pull ring affixed to its outer end;
    spring means surrounding the portion of the central shaft between the reel means and the bottom of the handle body, said spring means being affixed between the reel means and the bottom of said handle body so that when the reel means is turned in a first direction by the pulling of the pull ring, the spring means will cause the reel means to turn in the opposite direction when the line means is released;
    a second one-way clutch held by said handle body, said second one-way clutch contacting said central shaft and permitting it to turn only in a second direction, whereby when said reel means is moved in a first direction by the pulling of said pull ring, said reel means turns freely with respect to said central shaft but when said pull ring is released, the spring means turns the reel means in a direction opposite to said first direction and said second one-way clutch transmits the rotary motion of said reel means to said central shaft thereby turning said panoramic camera and retracting the line means.

* * * * *